July 23, 1957

F. M. MAYES 2,799,946

TUBING CALIPER

Filed June 8, 1955

*INVENTOR.*
FRED M. MAYES
BY
ATTORNEYS

U̇nited States Patent Office 2,799,946
Patented July 23, 1957

2,799,946

TUBING CALIPER

Fred M. Mayes, Newtown Square, Pa., assignor to Sun Oil Company, Philadelphia, Pa., a corporation of New Jersey Application June 8, 1955, Serial No. 514,061

8 Claims. (Cl. 33—178)

This invention relates to a device for simultaneously calipering and recording accurately the interior surface conditions of pipes, tubes, and like conduits.

Devices of this general type are well known and have gone into extensive use. Heretofore such devices of practical types have been mechanical in operation, particularly since under the acceptable conditions of operation recording must be accomplished locally in the device itself, it being impractical to transmit signals to surface recording apparatus.

The general consideraions involved in such a device need not be set forth herein since they are fully discussed in the patent to John V. Fredd, No. 2,637,117, dated May 5, 1953, which discusses a typical mechanical calipering device of the type just indicated. As will appear hereafter certain of the mechanical aspects of that device may be used in carrying out the present invention.

A disadvantage of the mechanical recording type of calipering device is that between the probing fingers and a recording stylus relatively massive members are used, and in order to obtain fast response of the stylus at the high logging speeds desirably employed, stiff springs must be used to push the probing fingers against the tubing wall.

In accordance with the present invention probing fingers may be used but since they are required to control only very light elements they may themselves be made of relatively light construction and light spring means may be utilized so that they may exert only slight pressure on tubing walls while still being capable of proper fast response. The conditions just indicated are made possible by causing the fingers to operate inductance means converting displacements into electrical signals. These signals are then recorded within the device itself, preferably on a magnetic member, which may be "read" at the surface following the logging operation. By recording within the device, there is eliminated any necessity for conductive cable connected to the surface, the apparatus being battery operated.

One of the limitations on the mechanical type of calipering and recording device has been that of limitation on the total length of tubing which may be examined with one pass of the caliper. This limitation is imposed by reason of the necessity of a lead screw and recording chart, any increase in recording scope involving the necessity for further increase of inertial mass and consequently still stiffer springs. In accordance with the present invention the logging capacity is practically unlimited since recording may be accomplished on a magnetic tape or the like having complete mechanical independence of the sensing fingers.

Still another advantage provided in accordance with the present invention is that of elimination of the necessity for direct visual examination of the record itself, making possible a translation of the original record into a record which may contain, for example, only indications of corrosion pits deeper than a predetermined amount and which would therefore be of particular interest.

The objects of the invention relate to the securing of the advantageous results above indicated both individually and in combination. These together with detailed objects relating to matters of preferred construction and operation will become apparent from the following description read in conjunction with the accompanying drawing in which:

Figure 1 is a diagrammatic elevation partly in section, showing one form of the calipering device provided in accordance with the invention, the figure particularly showing mechanical elements thereof;

Figure 2 is a diagram showing preferred electrical elements which may be used in the device; and Figure 3 is a diagram illustrating apparatus for use in translating a record produced in the device.

While the mechanical elements of the device may take numerous forms, there are illustrated in Figure 1 mechanical elements which are generally similar to those discussed in said Fredd patent, No. 2,637,117, with the understanding, however, that the parts may be made much lighter in mass and with associated springs much weaker than those required in the mechanical device of the patent, though for purposes of illustration the mechanical parts are shown substantially as they appear in said patent.

The body of the device is indicated generally at 2 and pivotly mounted therein are the fingers 4 which are arranged to engage the interior wall of tubing T which may contain pits such as indicated at P. Spring arrangements indicated at 6 control the fingers 4 to engage them with the tubing wall. It will be understood that the arrangement indicated contains the mechanical details associated with the control of the fingers such as shown in said patent, there being involved, for example, the tripping arrangement indicated at 8 which serves to render the fingers active only after the device has been lowered to the full amount desired and has begun its upward movement during which calipering is to occur. The head 10 of plunger 12 corresponds to the head 105 illustrated in said Fredd patent and it will be understood that all of the elements thereabove may be identical with those discussed in said Fredd patent and operate similarly. In the patent the finger 4 which at any instant is the most outwardly of those of the group, for example, by reason of engagement in a pit P determines the position of the plunger 12. In accordance with the present invention the plunger arrangement is utilized for a different purpose than that described in said patent. The plunger is urged upward by a light spring 14, very substantially weaker than the springs 6 which act upon the fingers 4.

Below the location of the fingers and plunger 12 there is the protective housing 16 forming part of the caliper body. In the upper portion of this housing there is located a core 18 provided with a winding 20, the legs of the core being located within blind holes in the cap member 24 of the housing. The ends of the core legs approach closely to the upper surface of this cap but desirably do not extend therethrough since sealing is desirable to some extent at least against the high pressure existing in the bore hole liquid. The cap member 24 is desirably made of a strong non-conducting material such as a plastic at least in its central portion, or of non-magnetic metal interrupted by plastic insulation to prevent the existence of a short circuiting turn about either of the core legs. However, in various cases such short circuit is not of great materiality and cap 24 may therefore be entirely of metal so long as it is non-magnetic.

The lower end of the plunger 12 carries a pole piece 22 which is located closely adjacent to the ends of the legs of the core 18, being movable relatively thereto in accordance with the position of the finger 4 which has moved outermost into contact with the tubing wall. Several alternative arrangements are possible. Pole piece 22 may be of magnetic material but unmagnetized, in which case its movements affect the reluctance of the effective magnetic core of the coil 20 thereby changing its inductance. Alternatively, the member 22 may be in the form of a strong permanent magnet which by virtue of its position relative to the core 18 produces variations near the saturated region of the core thereby effecting inductance changes. As will appear hereafter the inductance of winding 20 serves for the control, desirably, of the frequency of an oscillator, the frequency then varying in accordance with the position of pole piece 22, which in turn varies with the position of the outermost finger 4.

The leads from the winding 20 have electrical connection with apparatus within a casing 26 which may be completely sealed against pressure existing in the hole, the electrical connections being made through conductors molded into an insulating plug. In turn, the sealed casing 26 has electrical connection of its interior components through cable means indicated at 28 with a recorder within a second casing 30, which involves mechanical connections to its interior and hence may be initially filled with oil surrounding its operating parts to exclude mud or other dirt in the liquid which may exist in the hole. Arranged to drive the recorder within the casing 30 are mechanical devices similar to those indicated in said Fredd patent, including reduction gearing 32 driven from worm gearing 34 in turn driven by a wall-following roller 36 which is pressed tightly against the tubing wall as described in said Fredd patent. The roller 36 produces a drive displacement of the recording element which is proportional to the movement of the member along the tubing. Desirably a uni-directional clutch is interposed in the drive between the roller 36 and the recorder so that the recorder is not driven (reversed) during the movement of the calipering device downwardly but is driven only during its upward movement during which calipering is to be effected.

The electrical apparatus in the device is indicated in Figure 2. The winding 20 is an element of the frequency-determining portion of the circuit of a conventional oscillator 38 which may operate to provide an output in the audiofrequency range. The frequency of this output is then a measure of the position of the pole piece 22 and of the outermost finger. The output of this oscillator is delivered to the recording head 40 to impose corresponding frequency signals on a magnetic tape 42 of the recorder driven by the roller 36. A second oscillator 44 is provided, similar to the oscillator 38 but operating at a fixed frequency which may correspond, for example, to the midfrequency of the range of frequency of the oscillator 38. The output from the oscillator 44 is recorded on the tape 42 as a second channel by means of the recording head 46.

The oscillators 38 and 44 are enclosed in the casing 26 while the recording heads 40 and 46 form part of the magnetic tape recorder in the casing 30.

The purpose of the arrangement is to provide accurate operation despite variations in speed of movement of the caliper through the tubing. The effective frequency recorded per unit length of the magnetic tape would, of course, depend upon the speed of movement of the device, and the fixed frequency oscillator serves to provide a standard of comparison to take speed variations into account.

The foregoing will be made clearer by reference to the apparatus in Figure 3 which is used for reading the produced record after the calipering operation and after the tape is removed from the calipering device. The respective channel records made by the recording heads 40 and 46 are read by the reproducing heads 48 and 60. The former delivers its signals to an amplifier 50 which in turn delivers the signals through the limiter 52 and frequency discriminator 54 to the grid of a triode 56 arranged as a cathode follower in conjunction with a cathode resistor 58. The reproducing head 60 likewise delivers its signals through amplifier 62, limiter 64 and frequency discriminator 66 to the grid of triode 68 which is also arranged as a cathode follower in association with cathode resistor 70. A recording meter 72 is connected between the cathodes of triodes 56 and 68. For many purposes it is desirable to connect these cathodes also to a threshold detector 74 which provides an input to a recording meter 76 which may, in some cases, merely be a counter of peak pulses. The overall operation is as follows:

During the calipering operation, as the device is raised through the tubing, pits as well as tubing joints produce movement of the pole piece 22 to vary the inductance of winding 20 and hence the frequency output of oscillator 38. The output, therefore, is frequency modulated and will provide substantially uniformly spaced frequency deviations as each tubing joint is passed together with frequency deviations when pits are encountered and produce excessive outward movements of the various fingers which are disposed, as pointed out in said Fredd patent throughout the circumference of the device, a sufficient number being provided to secure reliable readings of all corrosion pits of significance. The uniform modulation deviations can be readily recognized in the final reproduction of the magnetic record and serve for the counting of the joints and location of pits in the sections of the tubing. At the same time the oscillator 44 produces a second record of its fixed frequency output through the head 46.

After the completion of the calipering operation the tape is removed from the device and reproduced through the apparatus illustrated in Figure 3. The reproducing head 48 will provide through the conventional amplifier, limiter and frequency discriminator a varying direct signal at the grid of triode 56. Due to what may be substantial changes in speed of the movement of the calipering device, however, there may be a very considerable range of variation of the signal applied to this triode grid, and while a meter might be used to record the cathode potential of triode 56 the large range would make accurate recording relatively difficult. Furthermore sudden speed changes might be confused with indications of pits. Such shortcomings are eliminated by providing to the grid of triode 68 a signal from the reproducing head 60 through its amplifier, limiter, and frequency discriminator. The signal appearing at the cathode of triode 68 will not show pits or joints but will vary in accordance with changes of speed of the calipering device in the same fashion as does the cathode of triode 56. Accordingly by measurement of difference of potential between the two cathodes, the effect of speed variations is substantially eliminated from the record produced by meter 72, the recorded curve of which is essentially a straight line but which will show deviations in the form of pulses or peaks corresponding to the tubing joints and pits.

While recording of two channels side by side on a tape has been specifically described, two channel recording on a wire may be used, utilizing the known practice of modulating a pair of high frequency carriers by the lower frequency outputs of the oscillators 38 and 44.

While, therefore, the fixed frequency oscillator 44 and its recording connection and the corresponding reproducing portion of the circuit of Figure 3 may be omitted, and in such case the recording in the device may be on a single channel on a wire, the arrangement shown is desirable since it cannot be expected that the calipering device will be moved at a uniform speed, particularly in view of the increase in diameter of the reel of the supporting wire as the device moves upwardly.

In many cases it is desirable to determine at least preliminarily whether the tubing is in such bad condition that it may need attention, and hence major interest is centered on the existance of particularly deep pits exceeding in depth a certain permissible value. Deep pits may be picked out by feeding the output from between the cathodes of triodes 56 and 68 through a threshold detector 74 of conventional form which provides an output only when peaks exceed some particular magnitude. The output of such detector may be recorded continuously by a recorder 76 or in conventional fashion, the pulses emitted from the threshold detector may be counted to give an estimate of the condition of the tubing.

While because of its simplicity the arrangement illustrated involving magnetic recording is preferred, it will be evident that similar results may be secured in many other fashions involving, for example, photographic or even phonographic recording electrically operated by the output of either oscillator 38 alone or of both oscillators 38 and 44, with corresponding reproduction, for example, in case of a photographic record by scanning of a variable density record or in the case of a phonographic record by a needle pickup. The equivalent of positioning of a member such as 22 may also be effected in various fashions as by a variable capacitance arrangement, or even by variation of a resistance to provide an input to electrical recording means. It will be evident that amplitude modulation rather than frequency modulation may be employed and even other types of modulation such as modulation of pulses in various conventional fashions. Such expedients, however, involve more complexity and hence the system which has been described is preferred.

It will also be evident that since only light pressure is required by detectors on the walls of the tubing other detecting means than that shown may be utilized. It is accordingly to be understood that the invention should not be limited except as required by the following claims.

What is claimed is:

1. A tubing caliper device arranged for movement through tubing in a bore hole comprising means for detecting surface variations of the tubing walls, means responsive to said detecting means providing a frequency modulated alternating current signal, means generating a fixed frequency signal, and means within said device providing simultaneous records of both of said signals.

2. A device according to claim 1 in which the recording means provides magnetic records.

3. Reproducing means for the record provided by a device according to claim 1, said reproducing means comprising a pair of means responsive, respectively, to the records of said two signals, and recording means operated by the last mentioned means to provide a record of the difference of the responses of the two means of said pair.

4. Reproducing means according to claim 3 in which said recording means provides a record only of values of said difference exceeding a predetermined magnitude.

5. A tubing caliper device arranged for movement through tubing in a bore hole comprising means for detecting surface variations of the tubing walls, means responsive to said detecting means providing a modulated alternating current signal, means within said device providing a record of said signal on a recording element, means driving said recording element at a speed corresponding to the rate of movement of said device through the tubing, and means providing on said recording element a record providing a measure of said rate of movement.

6. A device according to claim 5 in which said recording element is of magnetic recording type.

7. A device according to claim 5 in which the last mentioned means is a generator of a fixed frequency signal.

8. A device according to claim 6 in which the last mentioned means is a generator of a fixed frequency signal.

References Cited in the file of this patent

UNITED STATES PATENTS

| | | |
|---|---|---|
| 2,441,065 | Green | May 4, 1948 |
| 2,637,117 | Fredd | May 5, 1953 |
| 2,649,786 | Goble | Aug. 25, 1953 |
| 2,660,800 | Wiley | Dec. 1, 1953 |
| 2,665,187 | Kinley et al. | Jan. 5, 1954 |